(12) United States Patent
Beaven (10) Patent No.: US 9,499,273 B2
(45) Date of Patent: Nov. 22, 2016

(54) DE-ICING APPARATUS AND A METHOD OF USING THE SAME

(71) Applicant: ROLLS-ROYCE PLC, London (GB)

(72) Inventor: David Michael Beaven, Nottingham (GB)

(73) Assignee: ROLLS-ROYCE plc, London (GB)

( * ) Notice: Subject to any disclaimer, the term of this patent is extended or adjusted under 35 U.S.C. 154(b) by 448 days.

(21) Appl. No.: 14/163,524

(22) Filed: Jan. 24, 2014

(65) Prior Publication Data

US 2014/0219798 A1    Aug. 7, 2014

(30) Foreign Application Priority Data

Feb. 1, 2013 (GB) .................................. 1301789.2

(51) Int. Cl.
*B64D 15/12* (2006.01)
*B64C 11/20* (2006.01)
*B64D 15/14* (2006.01)

(52) U.S. Cl.
CPC ............... *B64D 15/12* (2013.01); *B64D 15/14* (2013.01); *B64C 11/20* (2013.01)

(58) Field of Classification Search
CPC ........ B64D 15/12; B64D 15/14; B64C 11/20
USPC ..... 416/39; 244/134 R, 134 C, 134 D, 134 F
See application file for complete search history.

(56) References Cited

U.S. PATENT DOCUMENTS

| | | | |
|---|---|---|---|
| 5,074,497 A | 12/1991 | Phillips, II | |
| 6,145,787 A | 11/2000 | Rolls | |
| 2003/0178412 A1* | 9/2003 | Goldberg | H05B 1/0236 219/497 |
| 2007/0257153 A1* | 11/2007 | Froman | B64C 29/0033 244/134 D |
| 2008/0111028 A1 | 5/2008 | Kumar et al. | |
| 2010/0065541 A1* | 3/2010 | Henze | B64D 15/12 219/202 |
| 2010/0243811 A1 | 9/2010 | Stothers | |
| 2013/0039759 A1* | 2/2013 | Perkinson | B64C 11/306 416/1 |

FOREIGN PATENT DOCUMENTS

| | | |
|---|---|---|
| CN | 101727114 A | 6/2010 |
| EP | 2 163 475 A2 | 3/2010 |

(Continued)

OTHER PUBLICATIONS

Jun. 14, 2013 Search Report issued in United Kingdom Patent Application No. GB1301789.2.
Sirotinsky, B., "Blade Anti-Icing Systems for Mil Helicopters," *Nineteenth European Rotorcraft Forum*, Sep. 14-16, 1993, pp. A2-0-A2-27.

(Continued)

*Primary Examiner* — Hoang Nguyen
(74) *Attorney, Agent, or Firm* — Oliff PLC (57) ABSTRACT

A propeller assembly comprises two or more blade elements each comprising two or more blade element portions arranged sequentially radially along the blade element. Each of the two or more blade element portions that are radially equi-positioned along corresponding ones of the two or more blade elements together form a blade element portion array.

Each of the two or more blade element portions comprise at least one heating element with each one of the at least one heating elements that is located in a correspondingly radially positioned blade element portion being connected to one another to form a heating element array.

The two or more heating element arrays are adapted to sequentially heat respective ones of the two or more blade element portion arrays so as to de-ice the blade elements.

15 Claims, 6 Drawing Sheets

(56) References Cited

FOREIGN PATENT DOCUMENTS

| | | |
|---|---|---|
| GB | 2 447 374 A | 9/2008 |
| WO | WO 2006/093480 A1 | 9/2006 |

OTHER PUBLICATIONS

European Search Report issued in European Patent Application No. 14 15 2311 on Jun. 4, 2014.

* cited by examiner

DE-ICING APPARATUS AND A METHOD OF USING THE SAME

This invention claims the benefit of UK Patent Application No. 1301789.2, filed on 1 Feb. 2013, which is hereby incorporated herein in its entirety.

FIELD OF THE INVENTION

The present invention relates to an apparatus for de-icing propellers and particularly, but not exclusively, to an apparatus for de-icing aircraft propellers.

BACKGROUND TO THE INVENTION

It is known to provide aircraft propellers with a means of de-icing their surface, generally only the leading edge of the blades, in order to avoid problems associated with excessive ice, such as the deterioration of propeller efficiency.

Conventional propeller de-icing techniques involve installing electrical heating elements or heating pipework along the leading edge of each propeller blade behind any leading edge erosion shield.

It is often unnecessary to install such de-icing means along the entire radial length of each propeller blade since, for example, the influence of centrifugal loading may prevent the formation of ice at the blade tip regions.

Figure 1A:
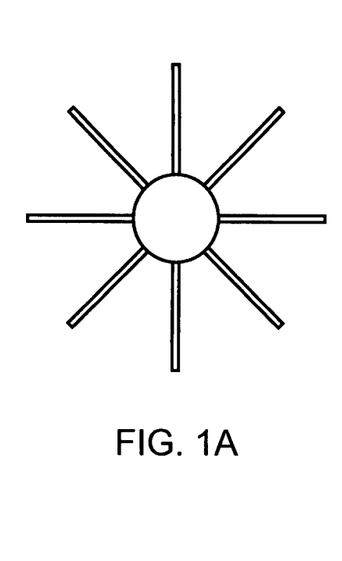
FIGS. 1A to 1D show schematic views of a propeller de-icing apparatus according to the prior art.
Figure 1B:
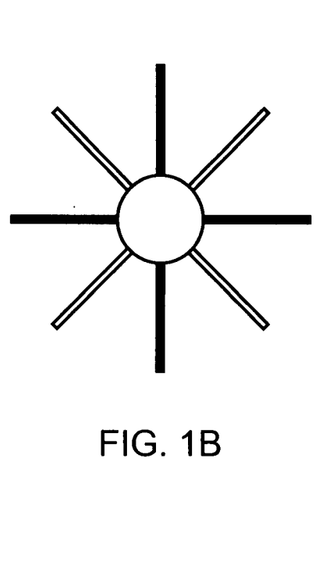

In a typical electrical de-icing application an electrical generator driven by the rotating propeller supplies electrical current to the heating wires running along the blade leading edges. FIG. 1A shows such an 8-bladed propeller arrangement with no current being supplied for blade de-icing, and FIG. 1B shows the same propeller arrangement but with current supplied to all of the blades.

Figure 1C:
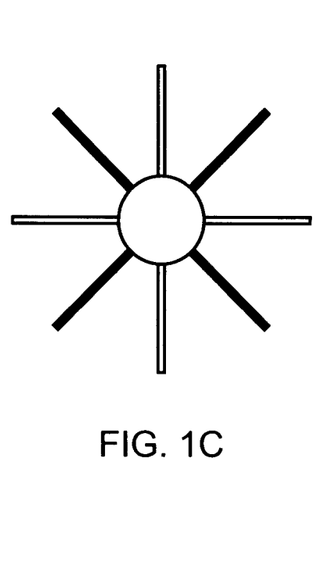
Figure 1D:
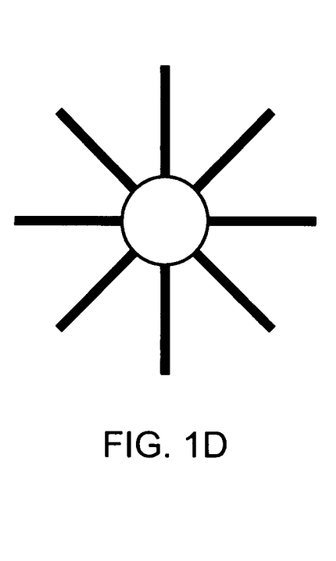

Since the electrical power supplied to the blades is proportional to the size and number of blades it is known to sequentially supply current to pairs or other groups of blades. For example, FIG. 1C shows the propeller arrangement of FIG. 1A with electrical current being supplied to two of the four opposing pairs of blades, while FIG. 1D shows electrical current being supplied to the remaining two pairs of blades.

This sequential supply of current may lead to ice accumulation during periods when no current is supplied to the blades but at a rate that does not lead to icing problems before the current is re-applied and de-icing is resumed.

With such a sequential de-icing arrangement it is clearly necessary to have a rotationally balanced de-icing arrangement to avoid vibration resulting from some blades being de-iced while others, whose de-icing current has been switched off, are allowed to accumulate ice.

Consequently such sequential current supply techniques can only be used with propeller assemblies having a number of blades that is divisible by another whole number. For example, for a six-bladed propeller, the de-icing current can be sequentially supplied to either two groups of three blades, or to three groups of two blades.

Figure 2:
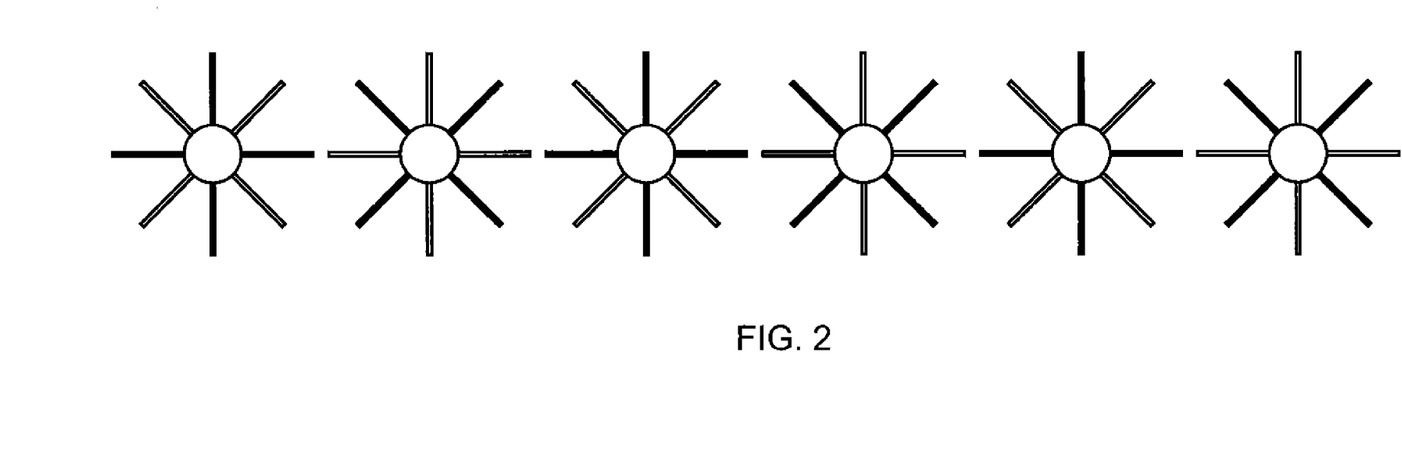
FIG. 2 shows a schematic view of the de-icing sequence of the propeller assembly of FIG. 1.

FIG. 2 shows the propeller assembly of FIG. 1 with two groups, each of four blades, being sequentially supplied with a de-icing current for a set period of time.

Figure 3:
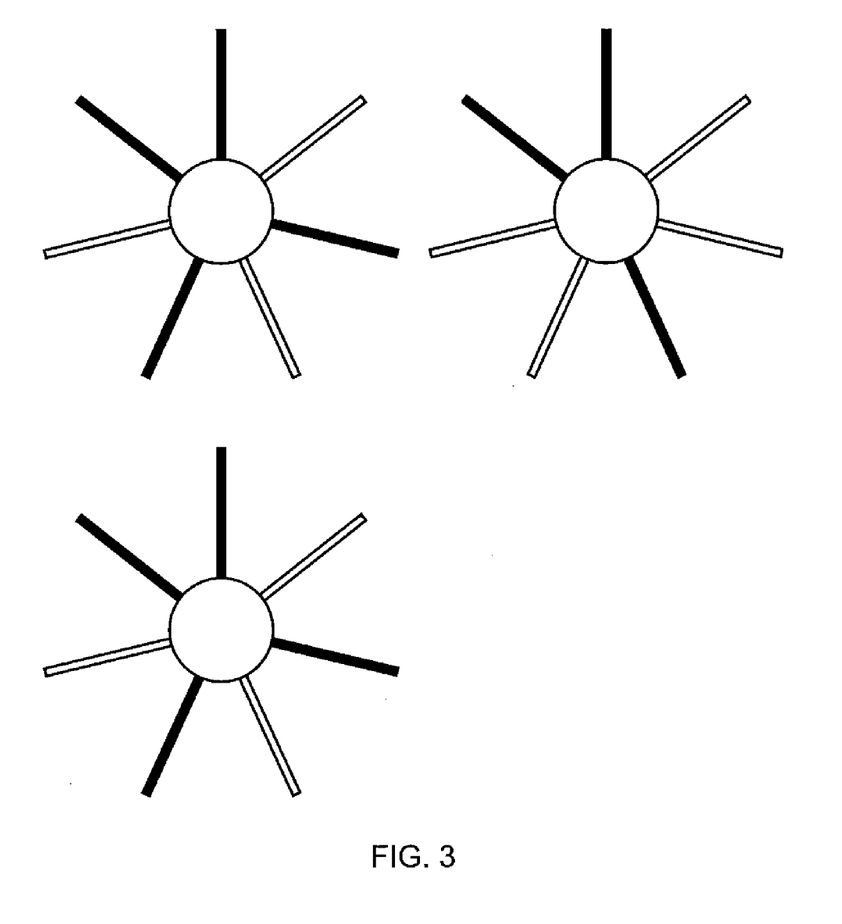
FIG. 3 shows a schematic view of a propeller assembly having a prime number of blades.

A problem with this known arrangement and technique is that if the propeller assembly comprises a prime number of blades then it is impossible to maintain rotationally balance of the propeller by selectively supplying a de-icing current to groups of the blades, as shown in FIG. 3.

STATEMENTS OF INVENTION

According to a first aspect of the present invention there is provided a propeller assembly comprising:

two or more blade elements, each blade element comprising two or more blade element portions arranged sequentially radially along the respective blade element, each of the two or more blade element portions that are radially equi-positioned along corresponding ones of the two or more blade elements forming a blade element portion array, each of the two or more blade element portions comprising at least one heating element, each one of the at least one heating elements that is located in a correspondingly radially positioned blade element portion being connected to one another to form a heating element array, and wherein the two or more heating element arrays are adapted to sequentially heat respective ones of the two or more blade element portion arrays.

By selectively de-icing each blade simultaneously but over differing corresponding radial lengths of the blades it is possible to de-ice a propeller assembly having any number of blades.

This selective de-icing reduces the power required for de-icing the blades while maintaining a rotationally balanced system for any blade arrangement, more particularly for propellers having a prime number of blades.

Optionally, the quantity of blade elements is a prime number.

Since it is known that there are applications, particularly open-rotor type applications where a prime blade number is aerodynamically optimum, the apparatus of the invention makes it possible to selectively de-ice such propeller arrangements. This makes such blade configurations more practical for a user since they can be more cost effectively de-iced.

Optionally, the propeller assembly comprises five blade elements.

Optionally, the propeller assembly comprises seven blade elements.

Optionally, the sequential heating of each one of the two or more heating element arrays takes place in a monotonically radially outward sequence.

By sequentially heating portions of each blade in a monotonically outward sequence it is possible to maintain a thermal gradient along the blade assembly which will assist in reducing ice accretion.

Optionally, each of the two or more heating element arrays is supplied with a quantity of heat, the magnitude of the quantity of heat being dependent on the radial position of a respective one of the two or more heating element arrays.

The degree of de-icing may be varied along the radial length of each blade because radially innermost parts of the blades may require more de-icing heat input than radially outermost parts of the blades. This is because as the blades rotate the centrifugal loading resulting from the rotation will be greater at the radially outermost parts of the blades so assisting the egress of accumulated ice.

Optionally, each one of the at least one heating elements in a respective one of the two or more blade element portions extends along substantially the entire radial length of a respective one of the two or more blade element portions.

By extending substantially along the radial length of the blade element, the heating element is able to de-ice the entire length of the blade element.

In another arrangement, the heating element extends along only part of the radial length of the blade element. This may, for example, be because the blade element experiences a degree of centrifugal loading which reduces ice accretion.

Optionally, the at least one heating element in a respective one of the two or more blade element portions extends along the leading edge of the respective blade element portion.

Since ice build up on a propeller blade occurs mainly along the leading edge, it is advantageous for the heating element to be positioned immediately beneath the surface of the blade leading edge. This makes the de-icing apparatus more efficient.

Optionally, the at least one heating element is an electrical heating element.

In one embodiment, the heating elements are electrical heating elements. The use of electrical heating elements makes the de-icing apparatus compact as large quantities of heat may be generated by passing current through the electrical heating element. This enables the de-icing apparatus to take up minimal space within the blade assembly which simplifies the design and manufacture of the blade and the associated propeller assembly.

In other arrangements, perhaps where there are few space constraints, the heating element may be a pipe containing a hot gas or a hot liquid.

Optionally, the electrical heating element comprises a single continuous, electrically conductive, filament, the electrically conductive filament extending in two or more passes along a respective one of the two or more blade element portions.

The use of multiple runs of electrical heating element along the blade element portion allows the blade designer to focus the delivery of the de-icing heat at particular areas or zones along the blade. This makes the de-icing apparatus more efficient and effective.

Optionally, the electrical heating element forming any one of the two or more heating element arrays is formed from a material having a different electrical conductivity to that material forming any other one of the two or more heating element arrays.

Each of the electrical heating elements is required to have the correct resistance in order to provide the required heat output at the corresponding radial distance to effectively de-ice the blade. The resistance of each heating element may be adjusted by appropriate material selection, i.e. by choosing materials having different electrical conductivities.

Alternatively, the diameter of the electrical conductor forming the heating element may be varied to thereby also obtaining the required resistance.

According to a second aspect of the present invention there is provided a method of de-icing a propeller assembly, the propeller assembly comprising two or more blade elements, each blade element comprising two or more blade element portions arranged sequentially radially along the respective blade element, each of the two or more blade element portions that are radially equi-positioned along corresponding ones of the two or more blade elements forming a blade element portion array, each of the two or more blade element portions comprising at least one heating element, each one of the at least one heating elements that is located in a correspondingly radially positioned blade element portion being connected to one another to form a heating element array, the method comprising the step of:

sequentially activating each one of the two or more heating element arrays.

Optionally, the step of sequentially activating each one of the two or more heating element arrays comprises the step of:

sequentially activating each one of the two or more heating element arrays in a monotonically radially outwardly extending sequence.

According to a second aspect of the present invention there is provided an aircraft propulsion unit comprising a propeller assembly having all of the features of the present invention.

According to a third aspect of the present invention there is provided a aircraft comprising a propeller assembly having all of the features of the present invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 4:
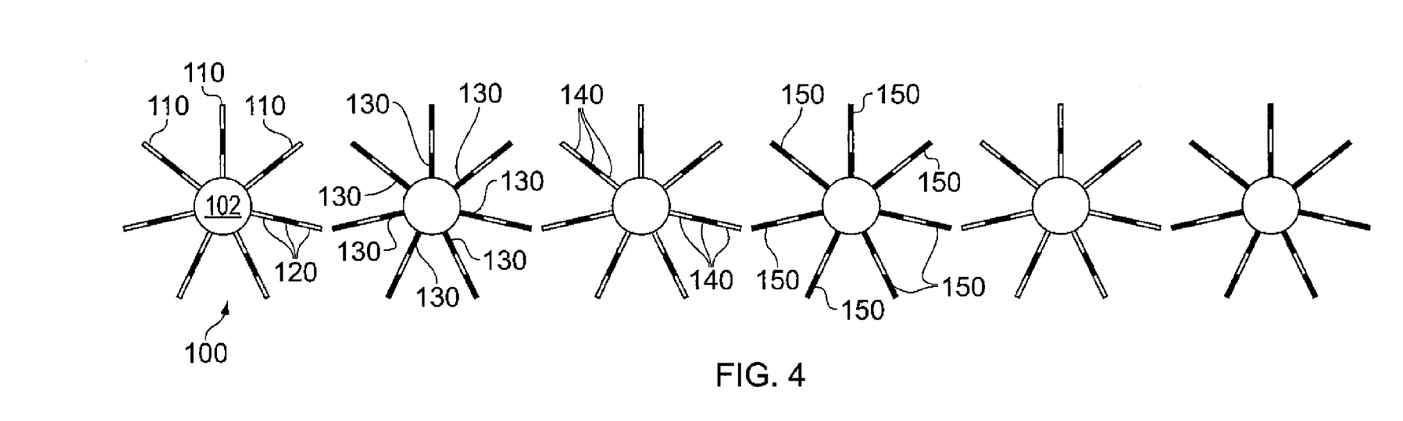
FIG. 4 shows a schematic view of a propeller de-icing apparatus according to an embodiment of the invention.
Figure 5:
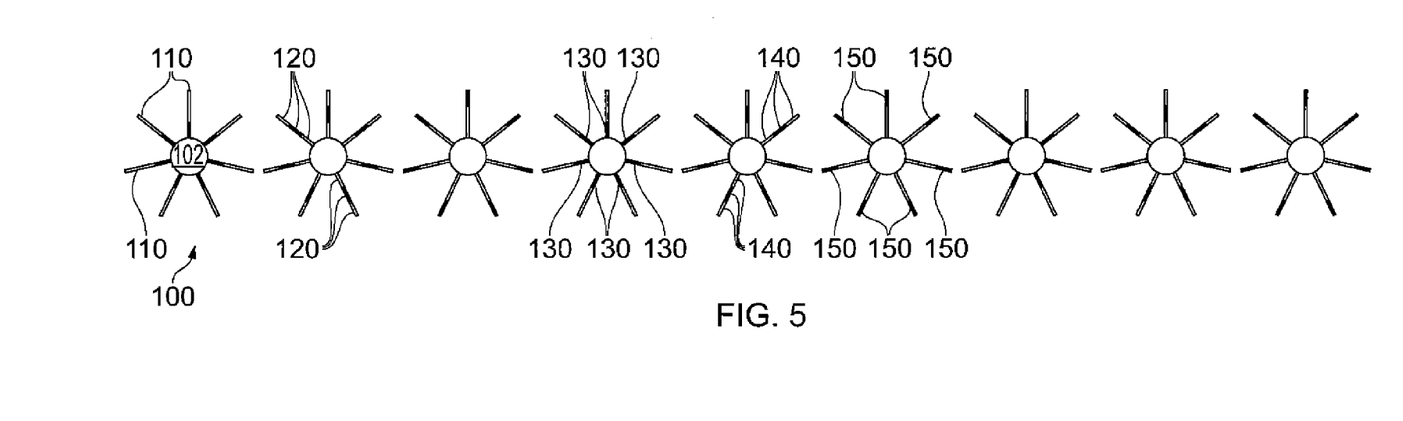
FIG. 5 shows a schematic view of the de-icing sequence of the propeller assembly of FIG. 4.
Figure 6:
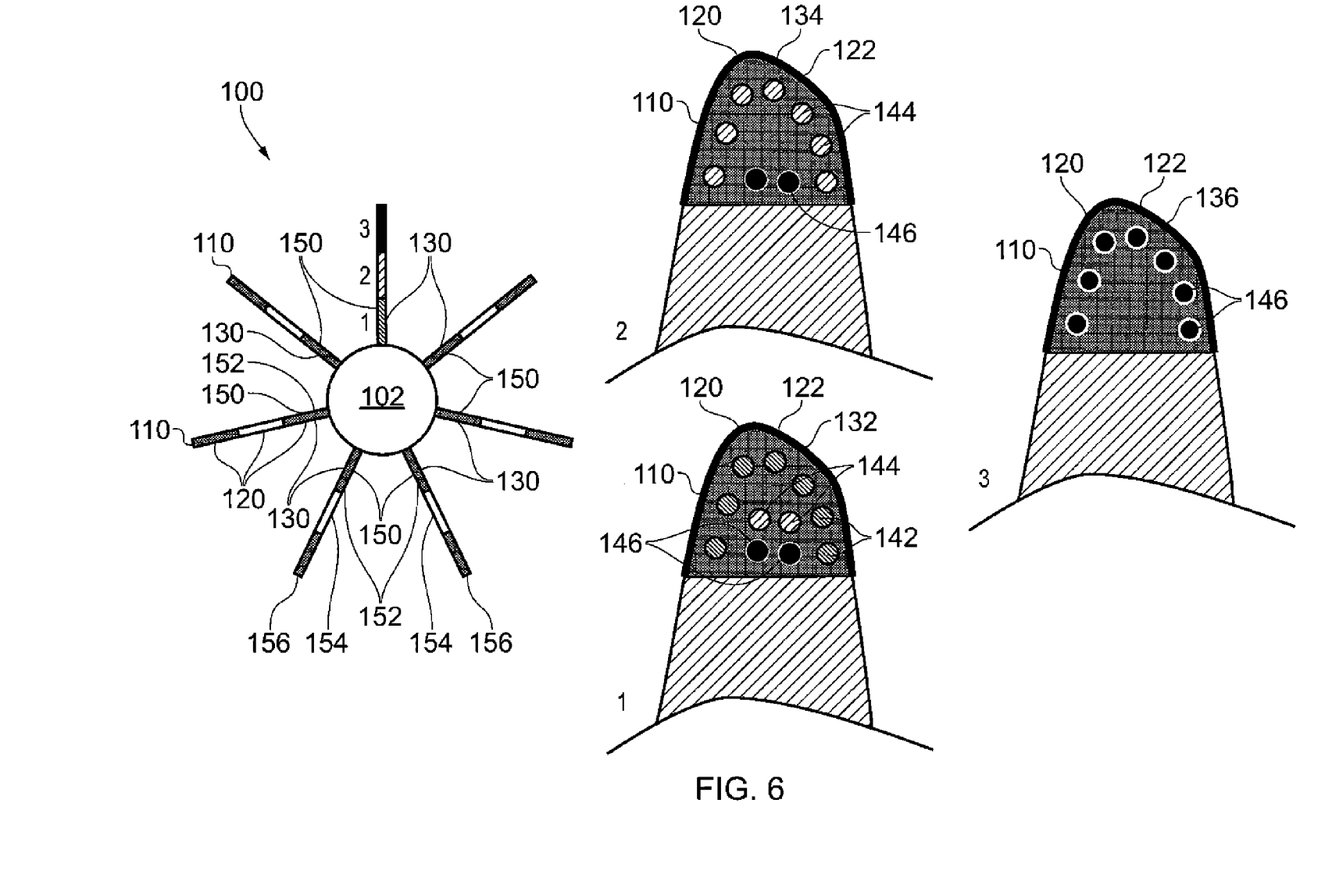
FIG. 6 shows a schematic view of the electrical wiring runs along a blade of the propeller assembly of FIG. 4.

Referring to FIGS. 4 to 6, a propeller assembly according to a first embodiment of the invention is designated generally by the reference numeral 100.

The propeller assembly 100 comprises seven blade elements 110. Each of the blade elements 110 comprises three blade element portions 120. The division of each blade element 110 into discrete blade element portions 120 is performed on the basis of the blade geometry, blade length and the operational environment in which the propeller assembly 100 will operate.

In the present embodiment each blade element 110 is divided equally into three blade element portions 120. In other embodiments the blade element 110 may be unequally divided into blade element portions 120.

Each of the blade element portions 120 that is radially equi-positioned along corresponding ones of the blade elements 110 collectively forms a blade element portion array 130. In the present embodiment therefore there is a radially innermost blade element portion array 132, an intermediate blade element portion array 134 and a radially outermost blade element portion array 136.

Each of the blade element portions 120 comprises a heating element 140. In the present embodiment this heating element takes the form of seven electrical heating filaments 140. On other embodiments, the heating element 140 may be an alternate number of electrical heating filaments or may be a pipe carrying a heated fluid or some other heat generating means.

Each one of the heating elements 140 that is located in a correspondingly radially positioned blade element portion 120 is connected to one another to form a heating element array 150.

In the present embodiment there is therefore a radially innermost heating element array 152, a radially intermediate heating element array 154 and a radially outermost heating element array 156. Each one of the heating element arrays 152,154,156 thus corresponds to, and provides a de-icing capability to, a respective one of the blade element portion arrays 132,134,136.

Each of the electrical heating elements 140 which make up respective ones of the heating element arrays 150 are electrically powered by a generator (not shown) that is positioned within the propeller hub assembly 102.

In the present embodiment, the radially innermost heating element array 152 comprises seven electrical filaments 142 that are positioned on the innermost surface of the leading edge surface 122 of the radially innermost blade element portion array 132.

The intermediate heating element array 154 comprises seven electrical filaments 144 that are positioned on the innermost surface of the leading edge surface 122 of the intermediate blade element portion array 134.

Similarly, the radially outermost heating element array 156 comprises seven electrical filaments 146 that are positioned on the innermost surface of the leading edge surface 122 of the radially outermost blade element portion array 136.

In use, only the radially innermost heating element array 152 is supplied with electrical current while the intermediate and radially outermost heating element arrays 154,156 are switched off. The supply of electrical current to the heating element array 152 is maintained for a first pre-determined time period.

At the end of this pre-determined time period, the electrical supply to the radially innermost heating element array 152 is switched off and the intermediate heating element array 154 is supplied with current for a second pre-determined time period.

Finally, the electrical supply to the intermediate heating element array 154 is switched off and the radially outermost heating element array 156 is supplied with current for a third pre-determined time period.

This sequential supply of electrical current to each of the heating element arrays 152,154,156 is then repeated for as long as de-icing of the blade elements 110 is required.

In the present embodiment the supply of electrical current to the respective heating element arrays 152,154,156 is performed in a monotonically radially outward sequence. However, in other embodiments the electrical current may be supplied to the heating element arrays 152,154,156 in other sequences.

In the present embodiment, the electrical current is supplied to each of the heating element arrays 152,154,156 for equal time periods. In other words, each of the above-mentioned first, second and third pre-determined time periods are equal.

Figure 7:
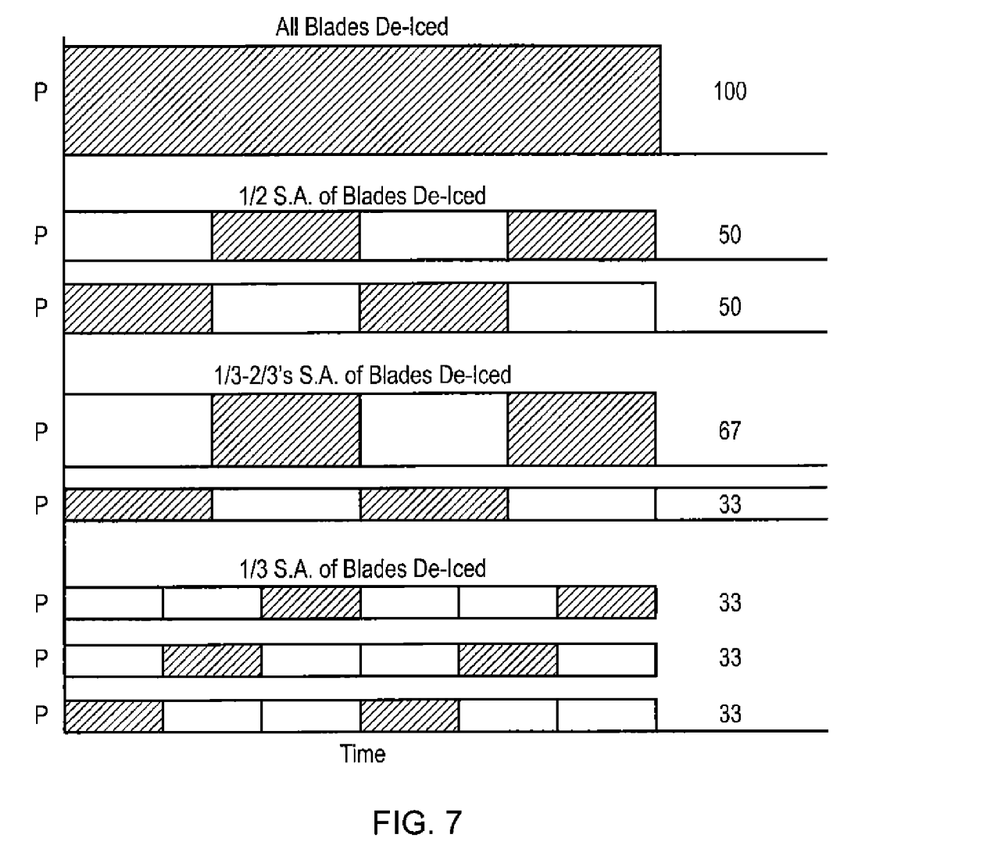
FIG. 7 shows the distribution of electrical power through electrical heating elements for various configuration of the propeller assembly of FIG. 4.

FIG. 7 shows a comparison of several different strategies for the supply of electrical power to the heating element arrays 150. Taking the continuous supply of electrical power or "All Blades De-Iced" as a benchmark it is clear that sequentially de-icing three portions each of 33% of the surface area of the blades is a more efficient use of the electrical energy than either a 100%, 50%-50% or 67%-33% electrical power distributions.

While there may be further efficiency gains by further increasing the frequency of the on-off switching of electrical current to the heating elements 140, it is likely that such increased frequency operation will ring with it thermal lag each time the current is applied to the heating element 140. Such thermal lags are likely to reduce the efficiency of the system.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A propeller assembly comprising:
    a plurality of blade elements, each blade element comprising three or more blade element portions arranged sequentially radially along the respective blade element, each of the three or more blade element portions that are radially equi-positioned along corresponding ones of the blade elements forming a blade element portion array,
    each of the three or more blade element portions comprising at least one electrical heating element that comprises a single continuous, electrically conductive, filament that extends in two or more passes along a respective one of the three or more blade element portions, each one of the at least one heating elements that is located in a correspondingly radially positioned blade element portion being connected to one another to form a heating element array, and
    wherein the three or more heating element arrays are adapted to sequentially heat respective ones of the three or more blade element portion arrays.

2. The propeller assembly as claimed in claim 1, wherein the quantity of blade elements is a prime number.

3. The propeller assembly as claimed in claim 1, comprising five blade elements.

4. The propeller assembly as claimed in claim 1, comprising seven blade elements.

5. The propeller assembly as claimed in claim 1, wherein the sequential heating of each one of the three or more heating element arrays takes place in a monotonically radially outward sequence.

6. The propeller assembly as claimed in claim 1, wherein each of the three or more heating element arrays is supplied with a quantity of heat, the magnitude of the quantity of heat being dependent on the radial position of a respective one of the three or more heating element arrays.

7. The propeller assembly as claimed in claim 1, wherein each one of the at least one heating elements in a respective one of the three or more blade element portions extends along substantially the entire radial length of a respective one of the three or more blade element portions.

8. The propeller assembly as claimed in claim 1, wherein the at least one heating element in a respective one of the three or more blade element portions extends along the leading edge of the respective blade element portion.

9. The propeller assembly as claimed in claim 1, wherein the electrical heating element forming any one of the three or more heating element arrays is formed from a material having a different electrical conductivity to that material forming any other one of the three or more heating element arrays.

10. A method of de-icing a propeller assembly, the propeller assembly comprising a plurality of blade elements, each blade element comprising three or more blade element portions arranged sequentially radially along the respective blade element, each of the three or more blade element portions that are radially equi-positioned along corresponding ones of the blade elements forming a blade element portion array, each of the three or more blade element portions comprising at least one electrical heating element that comprises a single continuous, electrically conductive, filament that extends in two or more passes along a respective one of the three or more blade element portions, each one of the at least one heating elements that is located in a correspondingly radially positioned blade element portion being connected to one another to form a heating element array, the method comprising the step of:

sequentially activating each one of the three or more heating element arrays.

11. The method as claimed in claim 10, wherein the step of sequentially activating each one of the three or more heating element arrays comprises the step of:

sequentially activating each one of the three or more heating element arrays in a monotonically radially outwardly extending sequence.

12. An aircraft propulsion unit comprising the propeller assembly as claimed in claim 1.

13. An aircraft comprising the propeller assembly as claimed in claim 1.

14. The propeller assembly as claimed in claim 1, wherein the three of more heating element arrays are adapted for sequential heating such that each of the three of more heating element arrays is supplied with a quantity of heat, and the magnitude of the quantity of heat decreases with the increasing radial distance of each of the three or more heating element arrays.

15. The method as claimed in claim 10, wherein each of the three of more heating element arrays is supplied with a quantity of heat, and the magnitude of the quantity of heat decreases with the increasing radial distance of each of the three or more heating element arrays.

* * * * *